United States Patent
Kumar

(10) Patent No.: US 10,264,214 B1
(45) Date of Patent: Apr. 16, 2019

(54) SYSTEM AND METHODS FOR TESTING A VIDEO CONFERENCE CALL USING A VIRTUAL ASSISTANT

(71) Applicant: Blue Jeans Network, Inc., Mountain View, CA (US)

(72) Inventor: Navneet Kumar, Bangaluru (IN)

(73) Assignee: Blue Jeans Network, Inc., Mountain View, CA (US)

( * ) Notice: Subject to any disclaimer, the term of this patent is extended or adjusted under 35 U.S.C. 154(b) by 0 days.

(21) Appl. No.: 15/860,963

(22) Filed: Jan. 3, 2018

(30) Foreign Application Priority Data

Nov. 14, 2017 (IN) .............................. 201711040672

(51) Int. Cl.
*H04N 7/14* (2006.01)
*H04N 7/15* (2006.01)
*H04L 29/06* (2006.01)
*H04L 12/18* (2006.01)

(52) U.S. Cl.
CPC ........... *H04N 7/15* (2013.01); *H04L 12/1822* (2013.01); *H04L 65/403* (2013.01); *H04N 7/141* (2013.01)

(58) Field of Classification Search
CPC ...... H04N 7/15; H04N 7/141; H04L 12/1822; H04L 65/403
See application file for complete search history.

(56) References Cited

U.S. PATENT DOCUMENTS

| | | | | |
|---|---|---|---|---|
| 9,984,705 B2* | 5/2018 | Sokolov | .................. | G10L 25/69 |
| 2009/0285367 A1* | 11/2009 | Diethorn | ............... | H04L 1/0026 |
| | | | | 379/32.01 |
| 2011/0282669 A1* | 11/2011 | Michaelis | .............. | G09B 19/04 |
| | | | | 704/270 |
| 2014/0214426 A1* | 7/2014 | Kanevsky | ............... | G10L 15/08 |
| | | | | 704/257 |
| 2015/0373183 A1* | 12/2015 | Woolsey | ............... | G06F 17/289 |
| | | | | 348/14.08 |

* cited by examiner

*Primary Examiner* — Stella L. Woo
(74) *Attorney, Agent, or Firm* — Ascenda Law Group, PC

(57) ABSTRACT

Embodiments are described for customizing a video conferencing user experience using a virtual assistant, and/or assisting a user in diagnosing issues concerning a video conferencing user experience. The virtual assistant may address issues based on automatically detected meeting quality measures as well as issues verbally communicated to the assistant by a user at an endpoint.

20 Claims, 8 Drawing Sheets

SYSTEM AND METHODS FOR TESTING A VIDEO CONFERENCE CALL USING A VIRTUAL ASSISTANT

CROSS-REFERENCE TO RELATED APPLICATIONS

This application claims the priority benefit of Indian Application No. 201711040672, filed on Nov. 14, 2017, the disclosure of which is incorporated herein by reference in its entirety.

FIELD OF THE INVENTION

The present invention is directed to approaches for configuring a video conference call using an interactive virtual assistant.

BACKGROUND

In a video conferencing system, typically a user tests his or her audio and video settings prior to joining the actual conference call in order to verify that the settings are acceptable and the call is likely to be completed without technical problems. This test can be performed using a parrot test call in which a server-side parrot implementation repeats the audio captured from the user's endpoint. However, the parrot test call requires that the user diagnose problems with the call and determine how to address the problems based on the user's perception of the test call. The user may be unaware of additional quality issues that could be improved with certain adjustments. Additionally, the user may not know how to address the problems the user identifies on his or her own.

Accordingly, there is a need for approaches that address these problems, and the present application discloses embodiments that address aspects of this need.

SUMMARY

Embodiments are described for facilitating customizing a teleconferencing user experience and/or diagnosing problems with the user experience using a virtual agent. In some embodiments, an upload audio stream and upload video stream generated at an endpoint of a video conferencing system are received, e.g., locally at the endpoint or at a server component of the video conference system. The upload audio stream may be converted to one or more text-user statements. One or more meeting quality parameters may be determined based on a test video stream, as well as one or more user-intent names and a corresponding one or more user-context parameters based on the one or more text-user statements. A responsive agent statement may be generated based on the one or more user-intent names or the one or more meeting quality parameters. An action may be generated based on the one or more user-intent names or the one or more meeting quality parameters. The responsive agent statement may be converted to an audio-agent-speech representation. A download video stream may be generated comprising an animated agent representation based on the audio-agent-speech representation, and a chat transcript comprising the one or more text-user statements and the responsive agent statement. A download audio stream may be provided, e.g., to the endpoint, comprising the audio-agent-speech representation and the download video stream. An instruction may be provided to a device to execute the action.

DETAILED DESCRIPTION

Embodiments of apparatuses, computer systems, computer readable mediums, and methods for deploying a virtual assistant as a means of configuring a user's experience at an endpoint prior to a joining a video conference enabled by a video conference service. For example, a virtual assistant may proactively diagnose problems and potential problems with the endpoint in view of the imminent video conference, such as sound quality or limited bandwidth, and the virtual assistant may facilitate customizing the user experience in accordance with the user's preference, such as allowing the user to select a preferred audio input from a collection of possible options (e.g., permitting a choice between a laptop internal microphone versus a USB microphone).

Use of a virtual assistant for configuring the user's experience has the advantage of providing a user interface that may be an alternative to or an adjunct to a more conventional static series of selections from drop down lists and selectors. For example, a user may prefer a conversational approach enabled by the agent in configuring the user experience. Some users may benefit from being able to express selections and specifics regarding the configuration using natural language (typed or spoken), rather than having to recognize or use a particular vocabulary; this aspect may benefit less sophisticated users. Some users may have difficulty typing or using a mouse, and being able to verbally communicate with the agent eliminates or reduces the need for typing and using indicator user input devices such as a computer mouse. In another aspect, the virtual assistant as a user interface may be more extensible, because, for example, a multitude of specific configuration options may be made available via the agent, but there is no need to display or list these options (as might be necessary using a conventional user interface) because the options will not be presented to the user unless they are determined to be relevant. The agent may proactively identify and address problems, and may notify the user regarding actions taken or may, for example based on the contextual information about the user experience, request information from the user in order to better assess and address an issue. Additionally, because a user interface incorporating the agent permits multiple modes of communication, the agent may provide links or URLs for additional information that may help address a user's issue, which provides an advantage over interacting with a customer service agent using a single mode communication such as a phone call.

Figure 1:
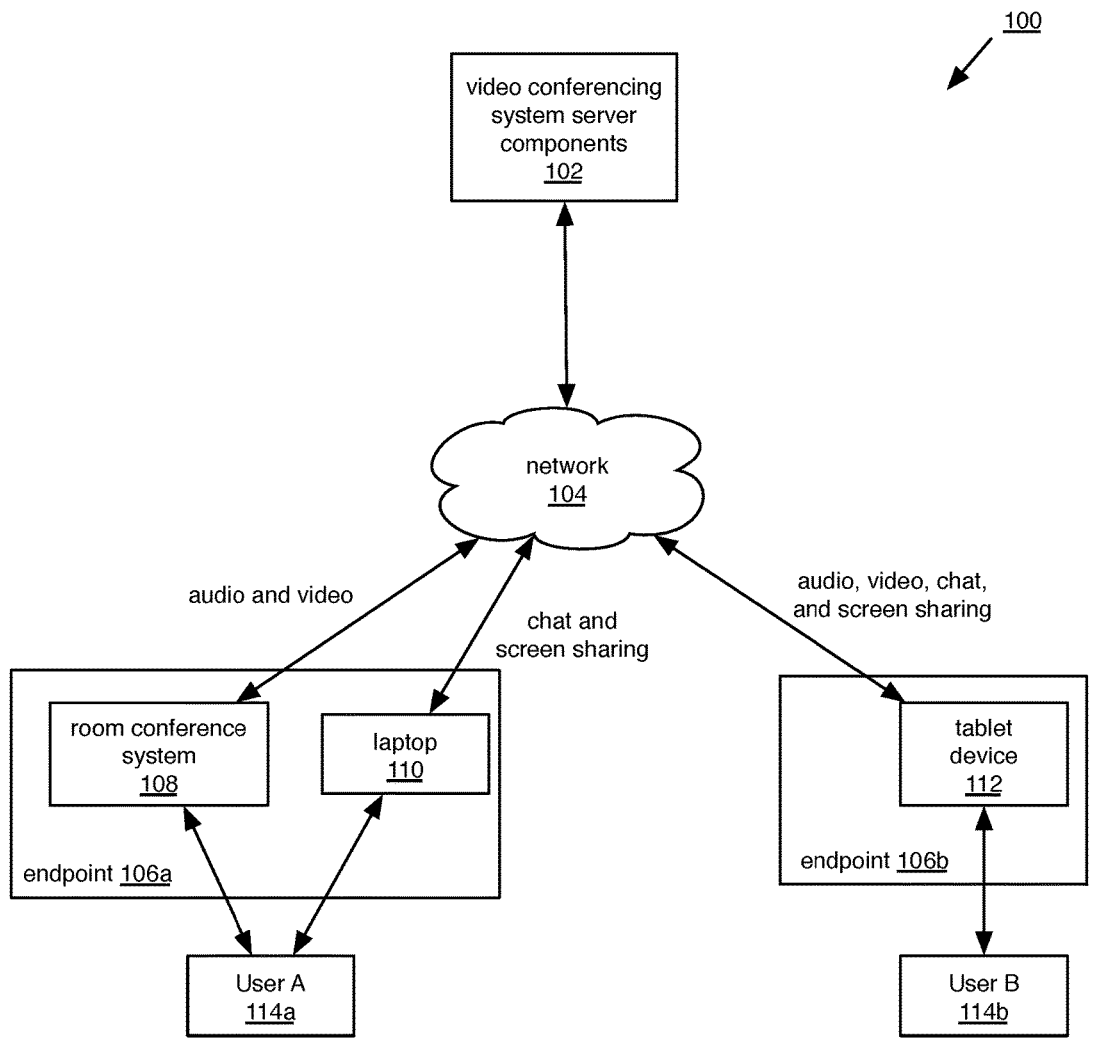
FIG. 1 depicts an exemplary video conferencing system in accordance with some embodiments of the invention.

FIG. 1 depicts an exemplary video conferencing system 100, in accordance with some embodiments of the invention. The video conferencing system 100 may include multiple devices associated with single video conference endpoints 106 (e.g., endpoints 106a and 106b in FIG. 1), each device with its own set of capabilities. A user 114 (e.g., users 114a and 114b in FIG. 1) can join a video conference call with (i) a room conference system 108 that can be used for audio and video, (ii) a tablet device 112 or laptop 110 that can be used for screen sharing, and (iii) a smart phone that can be used for chat, all of these electronic devices forming a single video conference endpoint 106. In the embodiment shown in FIG. 1, room conference system 108 and laptop 110 are associated as a single endpoint 106a with User A (114a), and tablet device 112 forms a second endpoint 106b associated with User B (114b). For example, if a video conference involves a room conference system with limited capabilities (e.g., no chat possible), a mobile device (e.g., mobile phone, tablet computer, laptop computer, etc.) can be used to supplement the capabilities of the room conference system (e.g., provide chat). In certain embodiments, any endpoint may join the video conference by sending a request to join the conference to the system 100 (e.g., to a client-facing server of video conferencing system server components 102), e.g., from a client application at a client device.

Video conferencing system server components 102 may support a set of capabilities, such as media processing and compositing capabilities video conference feeds from and to the various endpoints 106. Network 104 may be a wide area network (WAN), the internet, a telecommunications network, a local area network (LAN), or the like. The server components 102 may support a variety of video conferencing feeds of audio, video, audio and video, and/or other media data streams from video conferencing participant endpoints to present a video conference. Endpoints 106 may incorporate any type of device, including, but not limited to: laptops, computers, smartphones, tablets, phones, audio and video conferencing system devices, video conference room systems (e.g., Blue Jeans Huddle, Blue Jeans Relay, or Polycom RealPresence Group 700), and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints. In some embodiments, server components 102 may include an application server (e.g., a user experience engine) that renders multimedia content including but not limited to the composite audio/video stream to each of the participants to the video conference via one or more user interfaces.

Figure 2:
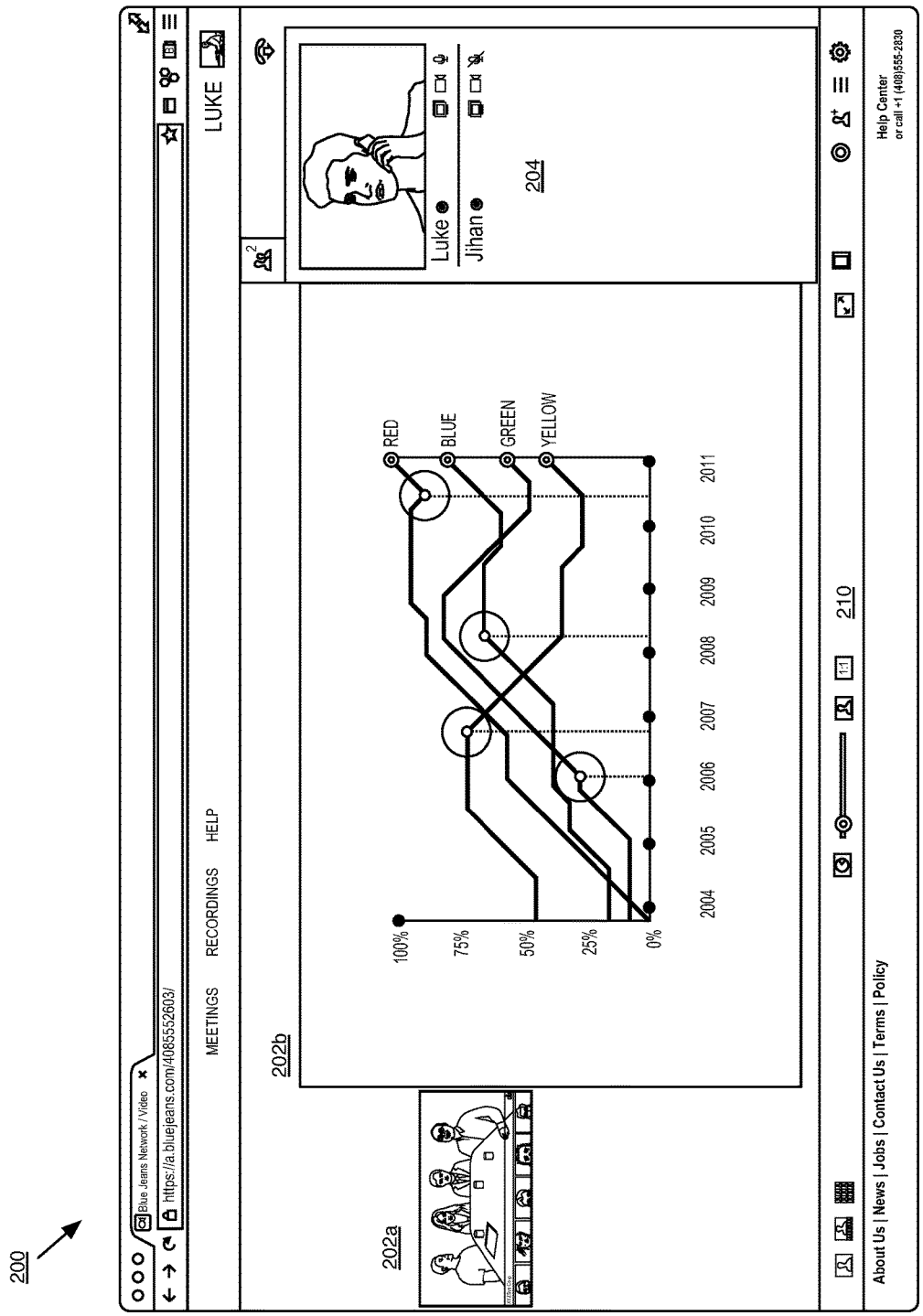
FIG. 2 shows an exemplary in-meeting user interface in accordance with some embodiments of the invention.

FIG. 2 shows an exemplary user interface 200 for participating in a teleconference at an endpoint 106, for example via a display at the endpoint. User interface 200 may be an HTML, or browser-renderable interface. User interface 200 may include one or more video streams 202—for example, video stream 202a, showing a feed from a camera aimed at participants at an endpoint (such as via room system 108 at endpoint 106a), and video stream 202b, showing a "screen sharing" stream (e.g., a stream mirroring the display of a device at an endpoint such as a laptop 110, in a circumstance where user interface 200 is presented to a user at a different endpoint (such as User B 114b at endpoint 106b). User interface 200 may additionally include a panel 204 indicating information about participants to the video conference, and a user interface control 210 for setting the appearance of the video stream layout, such as setting the relative sizes as displayed of categories of video streams (as shown in FIG. 2, a presentation category of stream (e.g., stream 202b) is selected to occupy a larger amount of space within the user interface relative to a participant-view category (e.g., stream 202a)).

Figure 3:
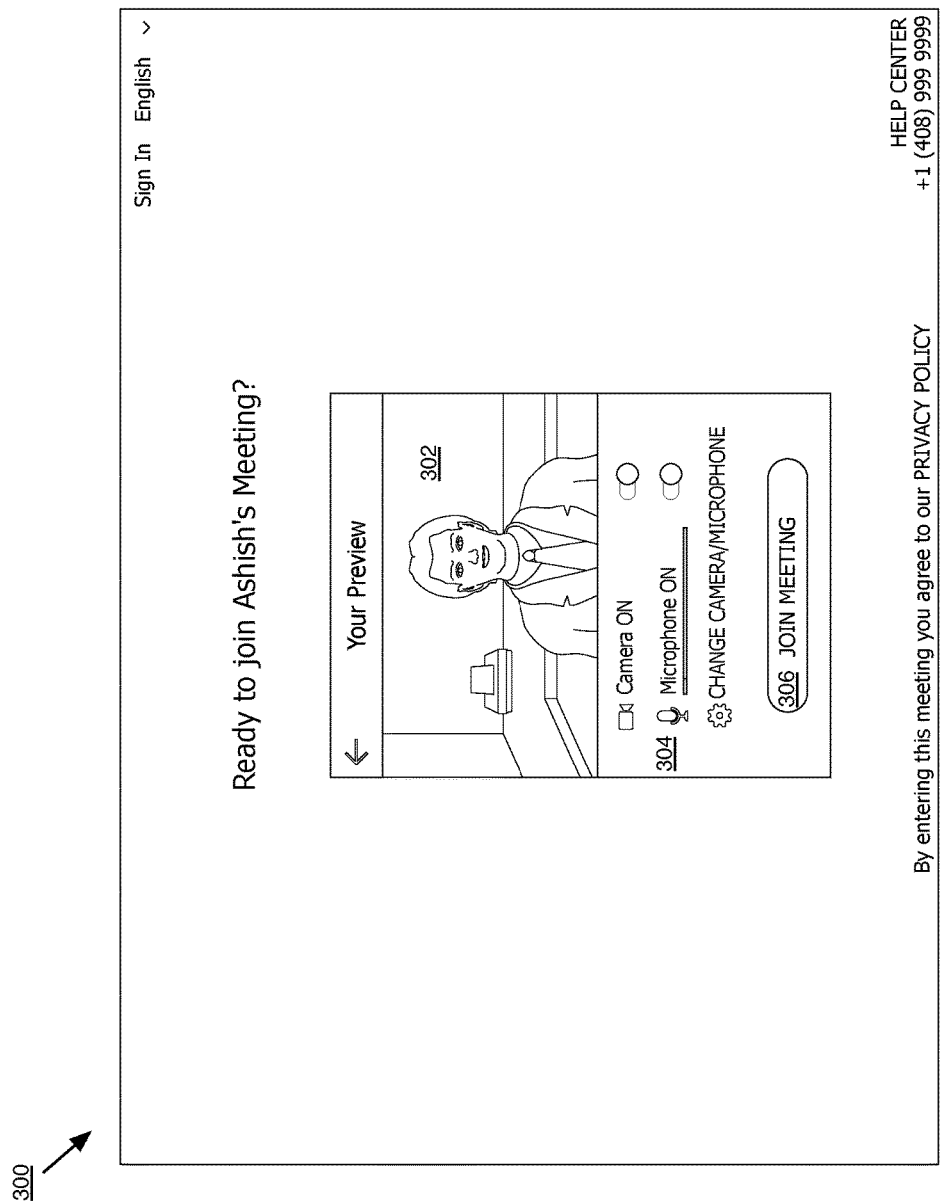
FIG. 3 shows an exemplary pre-meeting user interface in accordance with some embodiments of the invention.

FIG. 3 shows an exemplary pre-meeting user interface 300 for configuring a user's experience at an endpoint prior to a joining a video conference. Pre-meeting user interface 300 may include, for example, a preview video stream 302, showing the user at the endpoint the feed from the camera pointed at the user before joining a conference and sharing that feed with the other video conference participants (e.g., the feed corresponding to an upload video feed such as stream 202a shown at other endpoints during the imminent video conference). In certain embodiments, the pre-meeting user interface may additionally include controls 304 for configuring settings, such as whether the local camera is on (so that it will be shared in the video conference), and whether the microphone is on or muted. The controls may indicate, for example, the level of sound picked up by the microphone (e.g., by displaying a dynamically changing bar, where the bar length corresponds to the magnitude of the currently detected sound). The user interface may additionally provide an option to change the input device (e.g., to change the camera or the microphone—e.g., allowing the user to select from two or more options for the input devices, such as external USB cameras and microphones, or internal input devices built into a laptop, or components of a room system, and the like). The user interface may provide a control 306 for joining the endpoint to the meeting. In certain embodiments, user interface 300 is one of a series of pre-meeting user interfaces presenting different configuration options. For example, prior to or after interacting with user interface 300, the user may be presented with options to select an audio option for the video conference (e.g., to use the built-in computer audio, or separately dial in to the video conference using a phone for providing the user's audio stream). Such user interface options may also include a control for saving the settings for use with the next video conference.

Figure 4:
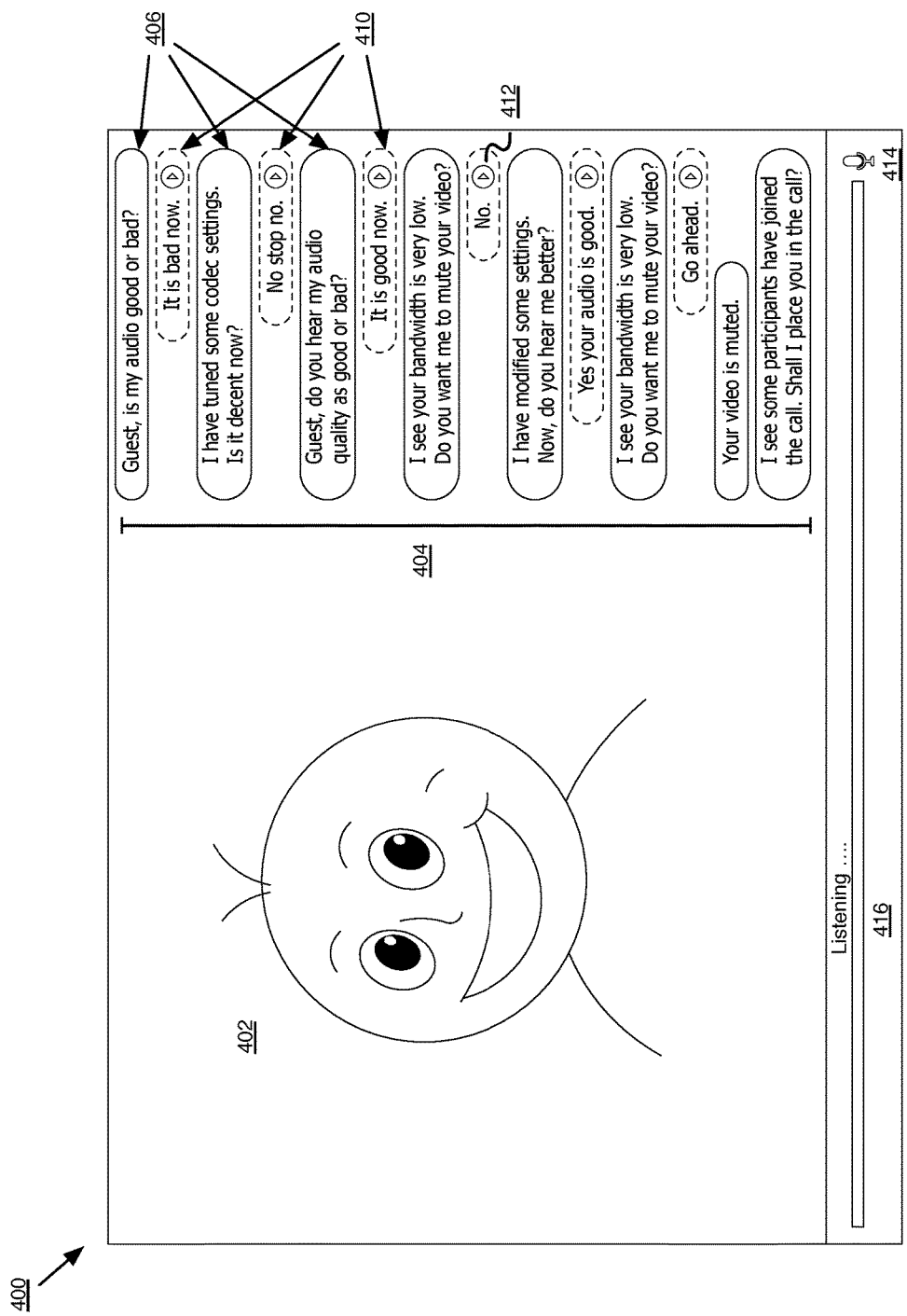
FIG. 4 shows an exemplary pre-meeting user interface in accordance with some embodiments of the invention.

FIG. 4 shows an exemplary pre-meeting user interface 400, the interface featuring a virtual assistant for configuring a user's experience at an endpoint prior to a joining a video conference. In certain embodiments, user interface 400 includes an animated agent representation 402 for visually interacting with the user. User interface 400 may be associated with automatically generated audio corresponding to the text prompts and responses generated by the agent (i.e., the agent's voice). Such an agent representation 402 may depict a human or animal face, and use lip sync techniques to generate a sequence of frames depicting the agent's face and corresponding to the words of an audio stream (i.e., corresponding to the agent's voice). The agent representation may additionally react to the user by, for example, directing the animated gaze of the representation toward the estimated location of the user's face using image processing techniques to locate the user's face in a preview video stream 302, and basing the representation's simulated eye contact on that location. In another example, the agent representation may nod when responding in the affirmative, and shake its head when responding in the negative. The agent representation may additionally show expressions such as a smile (e.g., when greeting the user or agreeing with the user) or a frown (e.g., when communicating information about a problem with the video conference). The agent representation's reactions may be achieved using a face/head detection/tracking library. In certain embodiments, the library may use Voila Jones-type algorithms or a Continuously Adaptive Mean Shift Algorithm (CamShift) for face detection, and in certain embodiments a smoothing algorithm to reduce jittering of the face tracking. The face tracking library may report the position of the head or face with respect to the camera used to track the face—e.g., x: position of the head in cm to the right of the camera, y: position of the head in cm above the camera, and z: position of the head in cm representing the distance from the camera. These coordinates may be translated to derive the corresponding coordinate on the display of the endpoint device, based on the screen width for the display, to position the agent representation's eye/pupil or entire head, if the head is moving or nodding in accord with the user on camera. The positioning of the pupil may be modulated with a dampening factor so that the eye or head movement looks realistic if the user is moving very fast, or if the movement is edge to edge.

In certain embodiments, instead of an animated human agent, the agent representation may be a depiction of a sound waveform that alters its shape based on, for example, the pitch and volume of the agent's voice.

User interface 400 may additionally present an agent chat transcript 404. The chat transcript 404 is the text transcript of the conversation between the agent and the user. For example, it may display agent statements 406 and user statements 410 in chronological or reverse chronological order. In certain embodiments, agent statements 406 may be represented differently from user statements 410; for example, the types of statements may be displayed using different colors, text styles, or in differently shaped "speech bubbles" corresponding to the statement type (e.g., agent or user), or with statement alignment (e.g., as shown, agent statements 406 are arranged at the left of the chat transcript 404, and user statements 410 are arranged at the right of transcript 404). In certain embodiments, agent statements including prompts for information (questions) are displayed differently from agent statements that report information and are not prompts. In certain embodiments, certain statement in the chat transcript 404 are associated with replay buttons 412 that, upon selection, play the audio associated with the text statement. In certain embodiments, one or both of an agent representation 402 or agent chat transcript 404 may be displayed in connection with all or some of the elements of user interface 300—for example, agent representation 402 and/or chat transcript 404 may be displayed in a panel adjacent to preview video stream 302. User interface 400 may additionally include a mute control 414 to mute the agent audio and/or a status indicator 416 to show that the agent is listening (receiving/recording user audio) or thinking (processing and obtaining a reaction to the user audio).

Figure 5:
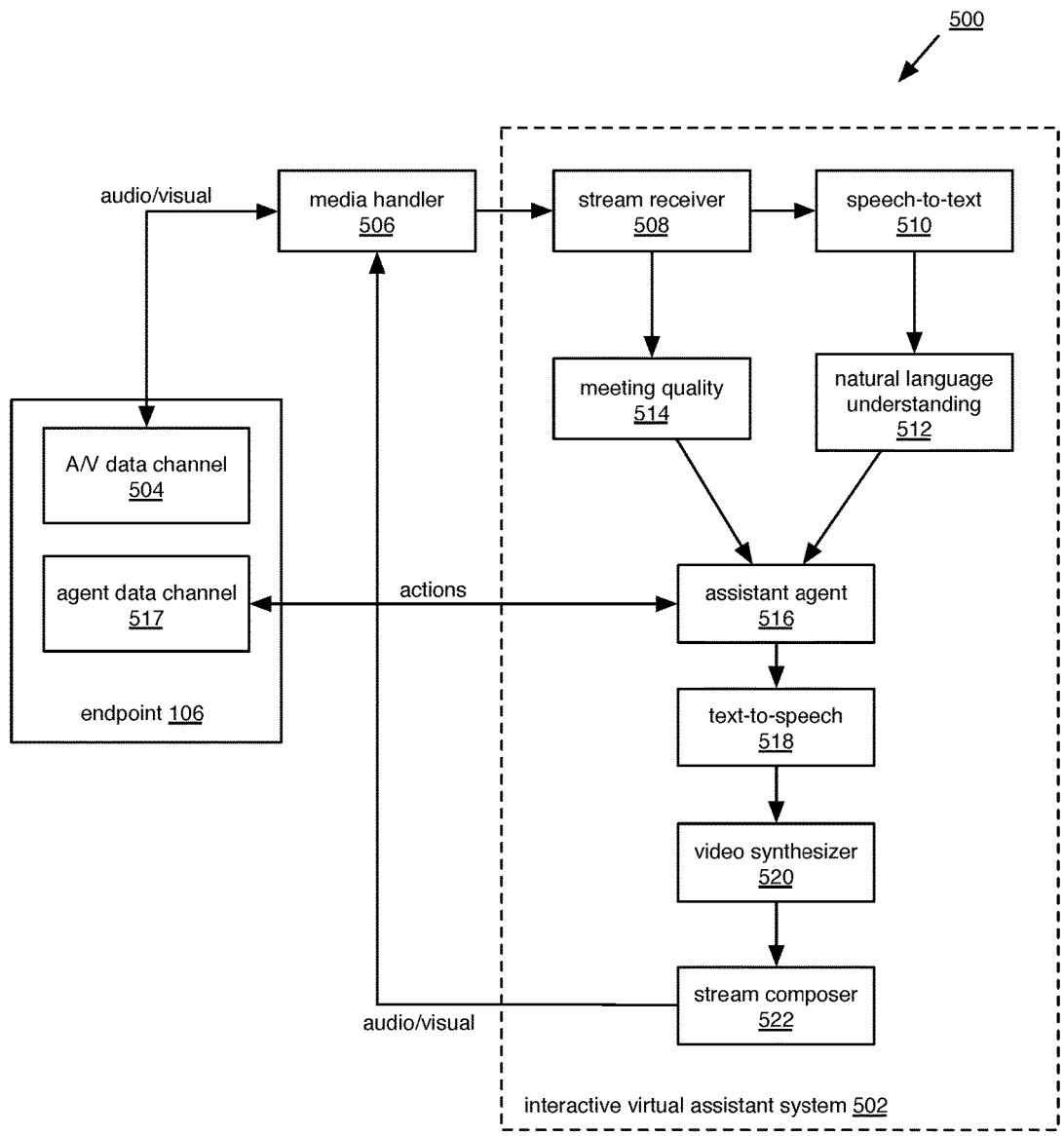
FIG. 5 shows an exemplary components of a video conferencing system including an interactive virtual assistant system in accordance with some embodiments of the invention.

FIG. 5 shows components of a video conferencing system 500 including an interactive virtual assistant system 502. In certain embodiments, a session is created when a conversation is started between the interactive virtual assistant system 502 and a user at the endpoint 106. The session may be maintained until the end of the conversation.

The components of system 500 include media handler 506, which receives audio and video streams from an audio/visual data channel 504 at endpoint 106, and provides composited media streams for display at endpoint 106. For example, A/V data channel 504 may be a client application at endpoint 106 providing the video stream from a camera at endpoint 106 and the audio stream from a microphone at the endpoint, and receiving composited audio and video streams from media handler 506 for display at the endpoint, e.g., in pre-meeting user interfaces 300 or 400. Media handler 506 mediates outgoing and incoming audio/visual streams between the endpoint 106 and the interactive virtual assistant system 502.

Incoming audio and video upload streams are provided to stream receiver 508 of the interactive virtual assistant system 502. Stream receiver 508 provides or pushes audio and video streams to particular components of system 502 for further processing and analysis. For example, stream receiver 508 may push the audio stream to speech-to-text converter 510, and the video and/or audio stream to meeting quality component 514. Speech-to-text converter 510 takes an audio stream and generates a corresponding text transcript. For example, such a conversion may be performed with a local speech recognition library or a cloud service provider (e.g., Google Cloud Speech API, Amazon Polly, Microsoft Azure Speech API). In certain embodiments, the transcript is a text stream or a string. In certain embodiments, the interactive virtual assistant system is provided with additional information, such as expected terms that may appear in the transcript, or a geographic location or user input to indicate the language of the speech in the audio stream, in order to simplify and increase the accuracy of the conversion by speech-to-text converter 510. In certain embodiments, the transcript may be translated to a different language prior to further processing—for example, the Swedish-language transcript of the user's audio stream may be translated to English text prior to the transcript being provided to natural language understanding processor 512. In certain embodiments, one or more segments of the transcript are associated with transcription confidence values, and only confidence values greater than a threshold confidence (e.g., 0.5) are provided to or used by natural language understanding processor 512. In certain embodiments, the user may type his or her statements at the endpoint, and this text may be directly provided to the interactive virtual assistant system 502 as user statements 410 without the need for the use of the speech-to-text converter 510.

Natural language understanding (NLU) processor 512 processes the transcript using natural language approaches to determine the user's intent based on the transcript made up of user statements, within the context of the conversation session. The user statements are unstructured in that the user is not required to express his or her intent using any particular phrasing. In certain embodiments, NLU processor 512 uses descriptions for the context of the user's statements (e.g., user utterances) in the transcript as well as grammar and machine-learning techniques to determine the intent and any relevant entities in the user statements. As used herein, the intent represents a mapping between a user's utterance in natural language to a pre-defined structured purpose (e.g., to communicate the user's opinion that sound quality is good, sound quality is bad, or a desire to select a microphone for use in the video conference). An intent name is an identifier for the user intent. There may be a pre-defined list of potential intents that may be identified in the user statements by NLU processor 512. Entities are extracted parameter values from user utterances which may be required to be present to find that an intent is implicated by the user utterance. For example, if the intent is to select a microphone for use during the video conference, the relevant entity may be a specification of the microphone (e.g., an internal microphone). An intent may be associated with a predefined set of context parameters.

In certain embodiments, NLU processor 512 may have access to a range of parameters concerning the context associated with the user, and may identify the context data that is relevant to the user's intent. Context parameters represent the current context of a user's statements, and may be used to pass on information from an external source, or a previous user or agent statement (e.g., to manage conversation flow). Context parameters may be used for differentiating phrases which can have a different meaning depending on the topic of conversation, the user's preference, or the state of the user interface. For example, for a user utterance comprising "Mute my video," the intent of the statement is "update_media", with entities "media_type"=VIDEO, and "media_action"=MUTE. Context parameters may be set based on a user profile containing user preferences and/or previously used settings by the same user. Context parameters may be extracted as entities from user statements. Context parameters may additionally be set based on entities in an agent statement, such as entities in an agent prompt, or entities that are added to the current context parameters when such an agent statement is generated. A detected intent may activate, deactivate, or renew a content parameter as current or active.

Each detected user intent may be associated with a confidence score and may additionally include one or more relevant context objects, where the context object is associated with a name and one or more parameters that describe the context. Additionally, a given context parameter may be associated with a lifespan which may be expressed in terms of time (e.g., next ten minutes) or number of requests (e.g., next ten requests). In certain embodiments, the lifespan may be the entire duration of the session. After the lifespan has elapsed, the associated context parameter will no longer be considered part of the current or active context for user statements and potential intents.

An example of the output, containing a detected user intent from natural language understanding processor 512 is:

```
{
    "sessionId": "356a03c7-569f",
    "textQuery": "I can hear you pretty clear as well",
    "intentName": "sound_check_answer_yes",
    "confidence": 0.9,
    "contexts": [
        {
            "name": "sound_quality",
            "parameters": {
                "selected_device": "InBuilt-Microphone"
            },
            "lifespan": 2
        },
        {
            "name": "meeting_quality",
            "parameters": {
                "username": "Navneet"
            },
            "lifespan": 10
        }
    ]
}
```

The interactive virtual assistant system 502 may include a meeting quality analyzer 514. There are several media streams that may be analyzed by the meeting quality analyzer 514. These include the video and audio streams transmitted from the endpoint 106 to the video conferencing system server components 102 ("upload streams"—i.e., the streams based on media capture at the endpoint, including, for example, video of the user or audio of the user's speech), and the video and audio streams transmitted from components 102 to endpoint 106 ("download streams"). In certain embodiments, upload streams may be analyzed based on the video and audio streams transmitted from the endpoint 106 to the virtual assistant system 502, and download streams may be measured based on the video and audio streams transmitted from the virtual assistant system 502 to the endpoint 106 (e.g., where the video conferencing system server components 102 comprise the virtual assistant system 502). In certain embodiments, only video streams are evaluated by the meeting quality analyzer. In certain embodiments, test data is generated and transmitted to evaluate the quality of a corresponding stream during a video conference. The meeting quality analyzer may determine network quality meeting parameters such as bandwidth, jitter, frame rate, and/or packet loss for one or more streams. In certain embodiments, this determination is an ongoing analysis and the values of the network quality meeting parameters are updated on a periodic basis during the session. In certain embodiments, the meeting quality analyzer may access or retrieve meeting quality parameters determined by other components of interactive virtual assistant system 502 or by a client application of endpoint 106. In certain embodiments, some or all meeting quality parameters used by the agent 516 are determined only by the meeting quality analyzer 514.

In certain embodiments, the meeting quality analyzer 514 uses image analysis to evaluate the quality of the video stream, for example, to determine whether the user is depicted in the video stream. By using face detection, the meeting quality analyzer can determine if the user is visible within the video stream, and if the user is centered within the field of view of the camera generating the video stream, or only partially in view. In another example, the analyzer 514 may determine the light level of the video stream, in order to facilitate a determination of whether the light level is unacceptably low. For example, the light level can be determined by analyzing a histogram of pixel intensity. If the histogram reveals a low intensity region, the video may be determined to be a low-light video stream, which can be reported to the user or can be automatically improved by applying contrast enhancement techniques or filters. Network quality meeting parameters and other meeting parameters including information about user visibility and location within the frame of the video stream may be saved as metadata associated with the session.

The assistant agent 516 is provided with the output of the meeting quality analyzer 514 and the natural language understanding processor 512, and can use this information to address meeting quality issues and customize the user experience based on user feedback. The assistant agent 516 receives as input structured conversational data from the natural language understanding processor 512 (e.g., detected user intent objects with associated context) and meeting parameters from the meeting quality analyzer 514. Based on analysis of the input, the agent 516 may generate a conversational textual reply (i.e., an agent statement 406) and, in certain circumstances, an action. As used herein, an action is an instruction to a client application at the endpoint 106, or an instruction to a server-side service (e.g., in which the subject action is executed at video conferencing system server components 102). (In certain embodiments, the substance of the action is reflected in the agent statement.) In certain embodiments, an action corresponds to a particular intent, such that upon detection of the intent in one or more user statements, the corresponding action will be generated. The assistant agent 516 provides actions to the client application via the agent data channel 517. Agent data channel 517 is co-located with the client application at the endpoint and establishes a socket connection to the agent 516 for two-way data transfer. Data channel 517 provides meeting quality parameters (e.g., bandwidth, packet loss, jitter) to the agent 516, and the same data channel is used by the agent to push actions (e.g., mute video, increase volume, select device: <value>) to the endpoint. In certain embodiments, meeting quality parameters are calculated at the endpoint 106 or at server components 102, or some mixture of both. For example, jitter, bandwidth, and packet loss can be calculated at either or both the client side (endpoint) or server side. Certain processor-intensive calculations, such as a calculation of lighting conditions, should be determined at the server side.

The assistant agent may diagnose issues by, for example, (1) detecting a meeting quality parameter value that is out of range, or (2) by issuing an agent statement 406 that is a prompt for information from the user; based on responsive user information, the agent may determine that an issue exists. Certain agent prompts may be issued in all sessions, and certain other agent prompts may be issued only in certain circumstances, such as when user settings conveyed via the agent data channel 517 or a meeting quality parameter meet certain conditions. For example, if the upload and download bandwidth (meeting quality parameters) are found to be below 512 kbps (as provided by the meeting quality analyzer 514), the agent may issue a prompt asking to mute the video. More specific examples and categories of diagnosis by the assistant agent are provided below.

The assistant agent may handle issues related to video quality assessment and diagnosis. In a video quality assessment, the agent 516 may first determine if any of the meeting quality parameter values is outside of an acceptable range, and if so, the agent may generate an agent statement 406 containing a notification of the unacceptable parameter value. If the issue implicated by the parameter can be addressed without any adjustment by the user, the agent 516 will provide an action instructing the client application to make the appropriate adjustment (e.g., (1) if the endpoint camera interface supports panning and zooming, and the user's face is not in the center of the screen (e.g., as determined by meeting quality analyzer 514), the agent may generate an action causing the endpoint to focus the camera on the user; or (2) if the available bandwidth as provided by meeting quality analyzer is within a specified range for a moderate bandwidth, the agent may instruct the video conferencing system to change the upload and/or download video stream to a lower resolution; below the range, the agent may generate an agent statement asking if the user wishes to turn off video). If the issue requires action by the user (for example, the meeting quality analyzer 514 face detection parameter indicates the user is only partly visible within the frame of the video stream), the agent may generate an agent statement 406 instructing the user to take action (e.g., "Your face is only partly visible in the video; please move so that you are visible."). In certain embodiments, if the issue remains while a lifespan for the issue has not elapsed (e.g., a lifespan for a corresponding context parameter), following a delay the agent will generate another agent statement 406 requesting that the user move until the user's face is visible. If the agent detects a user intent indicating that the user doesn't care about the issue, the agent will close the issue (i.e., determine that the issue does not exist or has been resolved and there is no need to attempt to diagnose it). In other examples, the video quality issue may be raised by the user, as represented by a user intent such as a desire to review a preview video stream 302, or in certain embodiments, the agent will always cause a preview video stream to be presented to the user, and may handle user intent concerning adjustments to the preview video stream. In other examples, the agent will handle user intents concerning video quality such as an intent to communicate that video quality is poor (e.g., expressed in user utterances such as "My preview video looks pixelated" or "My video resolution is very low") by, for example, (1) issuing an agent prompt asking the user if the video should be muted/turned off, (2) automatically changing the network for the video streams to a network having higher bandwidth, if such an alternative network path is available, or (3) issuing an agent prompt asking the user if it is ok to switch to an alternative camera at the endpoint.

The assistant agent 516 may diagnose and address the category of audio quality issues. For example, in certain embodiments, for all sessions, the assistant agent will issue an agent statement 406 that is a prompt requesting the user's comment on incoming audio quality (e.g., "[User Name], is my audio quality good or bad? Or [UserName], Can you hear me well?"). If a user statement 410 following the agent statement is determined, by the natural language processor 512, to implicate an intent that audio quality is good, the agent will close this potential issue. If an intent implicating poor audio quality is identified, the agent may generate a responsive action (e.g., select a different audio codec from the one currently used for the download audio stream) and issue another agent statement prompt to ask if the audio quality is better, or the agent may generate a prompt asking whether the user would like to switch to a different peripheral audio device (e.g., headphones having a microphone rather than the internal microphone for an endpoint device). If an additional prompt is issued, the agent may continue to monitor user statements 410 for an intent responsive to the additional prompt, or until a lifespan for the issue has been exceeded. In certain embodiments, audio quality issues will be diagnosed by the agent only if a precondition is met, such as a lack of a profile for the user indicating a previously used combination of profiles in a video conference that did not lead to any problems with the video conference; if such a profile exists, the agent may not execute a diagnosis of audio problems or a diagnosis of other problems, unless a user intent in an utterance indicates the user would like to revisit the configuration for the video conference. In certain embodiments, audio quality issues will be diagnosed only if an out of range meeting quality parameter indicates such a diagnosis is warranted. In certain embodiments, the agent may issue a prompt regarding the user's preferred volume for the download audio stream and whether or not the user would like to mute his or her upload audio stream for the video conference. Upon detecting a user intent responsive to the preferred volume or muting state, the agent will generate an appropriate responsive action (e.g., increase or decrease the volume of the download audio stream; mute or un-mute the upload audio stream prior to joining the user to the video conference).

The assistant agent 516 may diagnose and address the category of network quality issues. For example, if a network quality meeting parameter is out of range, the agent may determine that there is a network quality issue concerning that parameter and automatically generate an action to address the issue. In certain embodiments, the agent may generate an agent statement prompt to obtain more information in order to address the issue (e.g., using approaches similar to the ones described above in connection with audio quality issues). For example, if bandwidth is low, then the agent may propose turning off the video stream, and generate a corresponding action (i.e., instructing the endpoint device client to turn off the video stream) if the user's intent indicates the user agrees, or the agent may propose lowering the bandwidth of the video stream (upload and/or download). If jitter is high, then the agent may generate an action causing the endpoint client application to adjust the buffer memory, as a higher buffer memory can tolerate a high jitter for a smooth video experience. If packet loss is high (e.g., 10%-19%), then the agent may generate an action causing the endpoint connection to the video conference service to be reconnected; if packet loss is very high (e.g., >20%), the agent may generate an agent statement suggesting that the user reconnect to the video conferencing service using WiFi or Ethernet (e.g., as opposed to connecting over a cellular network connection).

The assistant agent 516 may diagnose and address the category of meeting connection issues. For example, if the user's intent indicates the user is ready to join the video conference, the agent may generate an action and agent statement notification regarding joining the user to the video conference. The agent 516 may be notified by a middleware service of the video conferencing system having a participant roster list that one or more participants have already joined the video conference, and may generate a corresponding agent statement 406 for notifying the user.

In certain embodiments, the assistant agent 516 may save a user's preferences in a profile in a database of system server components 102 for use during the next session involving that user. For example, the agent may record the audio peripheral device, video peripheral device, volume level, and video mute state for the user in the profile.

The agent statements 406 generated by assistant agent 516 are provided to text-to-speech converter 518. Text-to-speech converter 518 converts text (i.e., agent statements 406) to audio data containing the corresponding speech. This conversion may be performed using a cloud service such as IBM Watson text-to-speech, or using a local text-to-speech library.

The audio speech output from text-to-speech converter 518 and the agent statements 406 may be provided to video synthesizer 520 to generate the frames of the video for display at the endpoint (e.g., via user interface 400). For example, the video synthesizer 520 may generate an agent representation 402 with animation responsive to the audio speech output from converter 518 (e.g., if lip sync techniques are used to map the representation's lip movements to the speech or to generate expressions at appropriate times in the speech, or if the agent representation 402 is a waveform corresponding to the pitch and volume of the audio speech). Additionally, the agent representation 402 may be generated so as to be responsive to the location of the user's face in the camera, and synthesizer 520 may obtain the relevant face or eye location parameters directly or indirectly from the meeting quality analyzer 514.

The video frames generated by video synthesizer 520 and the audio speech output from converter 518 may be provided to stream composer 522. Composer 522 composes the video data from the synthesizer 520 and the audio data from converter 518 into audio and video streams, which are provided to the media handler 506, to be sent to the endpoint 106. In certain embodiments, e.g., in connection with diagnosing a video quality issue, a preview video stream 302 may be included in the video stream generated by composer 522 in addition to or in lieu of an agent representation 402.

In certain embodiments, the components of system 502 enable real-time interaction with the virtual assistant via the endpoint 106. For example, the user may provide spoken user statements, and hear responsive spoken agent statements and view an animated agent representation 402 without an unnatural lag time—for example, responses will be communicated via a download audio and video stream within one or two seconds or less. This real-time interaction is enabled by, in certain embodiments, performing text to speech and speech to text conversions local to the endpoint. In certain embodiments, real-time communication and minimal lag time is achieved using video synthesis executed local to the endpoint device, because the video frames do not need to be downloaded from a remote server, such as system server components 102.

Figure 6:
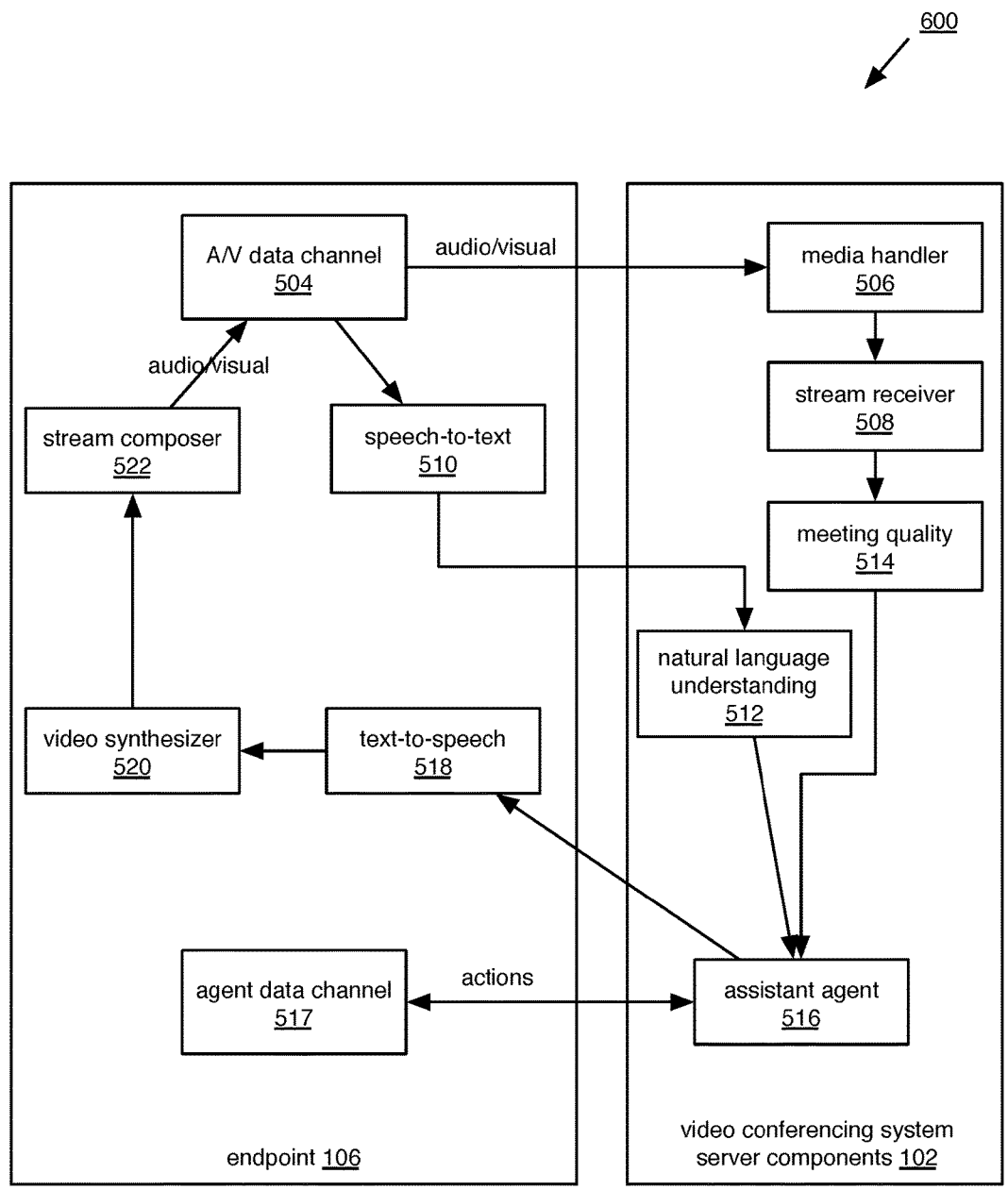
FIG. 6 shows an exemplary components of a video conferencing system including an interactive virtual assistant system in accordance with some embodiments of the invention.

The following is an exemplary chat transcript 404 representing a real-time audio conversation between the interactive virtual assistant and the user:
IVA: Welcome Navneet, let me check your settings before you join the meeting
User: Sure
IVA: I can hear you clearly. I hope you can hear me as well
User: I can hear you pretty clear as well
IVA: Navneet, I see your bandwidth is very low. Do you want me to turn off your video for better experience
User: Please go ahead
IVA: Happy to help. I am placing you in the meeting with video turned off. Thanks In certain embodiments, media handler 506 and interactive virtual assistant system 502 are remote from endpoint 106 (e.g., 506 and 502 may execute at video conferencing system server components 102 of FIG. 1). In certain embodiments, certain components of interactive virtual assistant system 502 may be local to endpoint 106 (e.g., as shown in FIG. 6), in order to minimize latency. In certain embodiments, the assistant agent 516 and the natural language processor 512 are implemented local to the endpoint.

Figure 7:
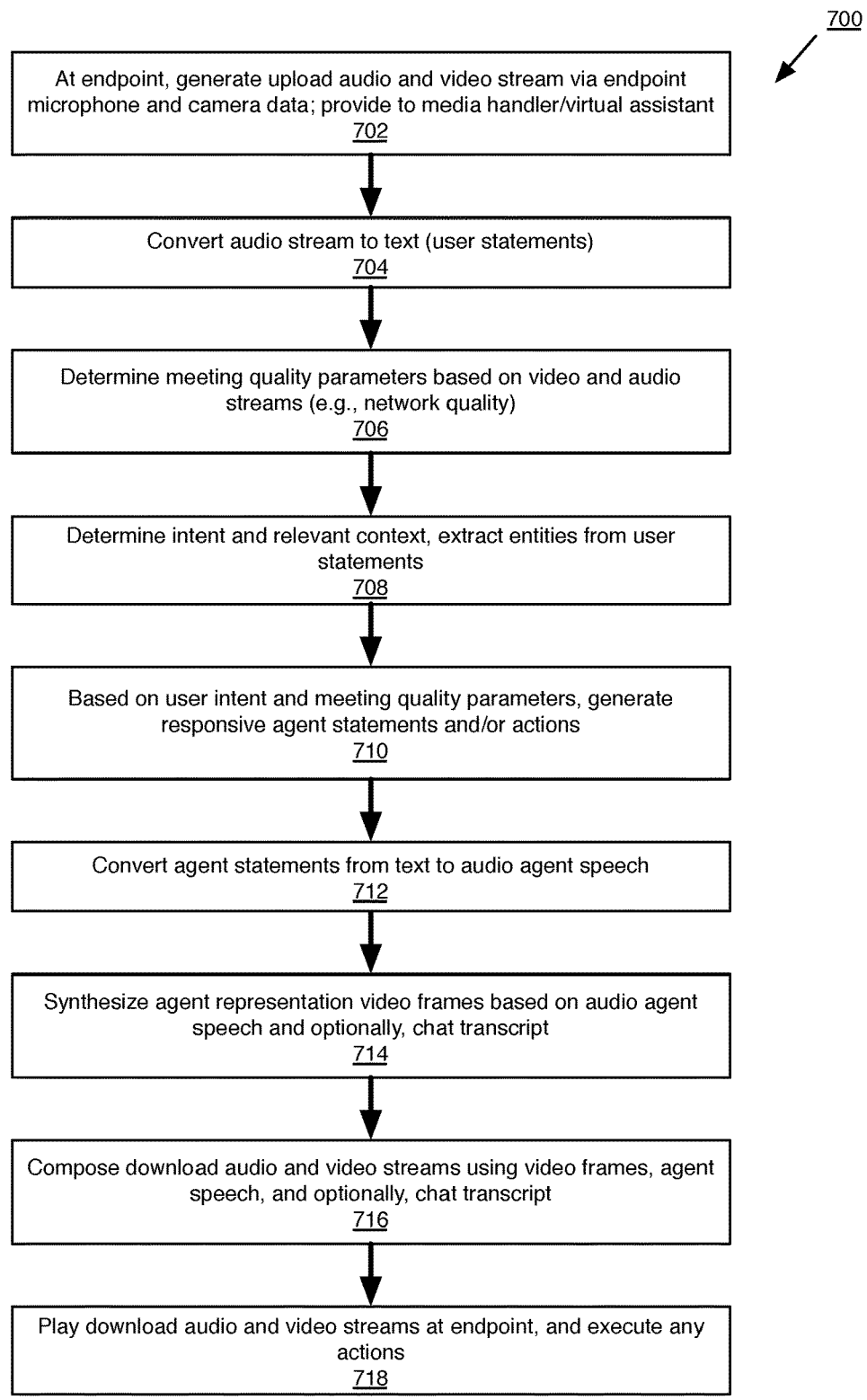
FIG. 7 shows a flow chart for an exemplary process concerning customizing a video conferencing user experience using a virtual assistant in accordance with some embodiments of the invention.

FIG. 7 shows a flow chart for an exemplary process 700 concerning customizing a video conferencing user experience using a virtual assistant. At endpoint 106, a local camera and microphone are used to generate data for upload video and audio streams, e.g. showing video of the user and representing audio that could include the user's speech (702). In certain embodiments, instead of providing user statements using speech via a microphone, the user may type the user statements via an input device such as a keyboard. Typed user statements may be used as described in step 708 below. The audio and video streams are provided to the interactive virtual assistant system 502. The system 502 converts the audio stream to text that may contain user statements 410, at, e.g., speech-to-text converter 510 (704). Video and/or audio streams representing transmission between the endpoint and a video conferencing server (e.g., video conferencing system server components 102) may additionally be analyzed, e.g. at an endpoint client application or by a server-based meeting quality analyzer 514 to determine meeting quality parameters such as bandwidth, jitter, frame rate, and/or packet loss; these parameters may be used to diagnose potential quality issues during an imminent video conference (706). The user statements from step 704 are analyzed, e.g., by natural language understanding processor 512, to determine any user intents represented in the user statements, and to identify descriptions of the relevant context for the intent and entities that may be represented in the statements (708). Based on user intent and meeting quality parameters, issues in the categories of video quality, audio quality, network quality, and meeting connection are identified, and responsive agent statements and/or actions are generated, e.g., by assistant agent 516 (710). Actions are provided to the endpoint for execution. Any responsive agent statements are converted from text to audio to represent agent speech, e.g., by text-to-speech converter 518 (712). Video frames corresponding to a visual agent representation 402 may be generated based on the agent speech audio from step 712, using, for example, video synthesizer 520 (714). In certain embodiments, the video frames are additionally generated to include a visual representation of all or a portion of the chat transcript 404 (e.g., the agent statements 410 and user statements 406). The video frames and agent speech audio are then used in composing audio and video streams for download, by, e.g., stream composer 522 (716). In certain embodiments, e.g., if the chat transcript is not already represented in the video frames, stream composer 522 may generate a composite video stream including the chat transcript. The download audio and video streams are provided to the endpoint and played at endpoint devices having a display for the video or a speaker for the audio, e.g. via a user interface such as user interface 400 (718). Additionally, any actions generated by the assistant agent 516 are executed.

Figure 8:
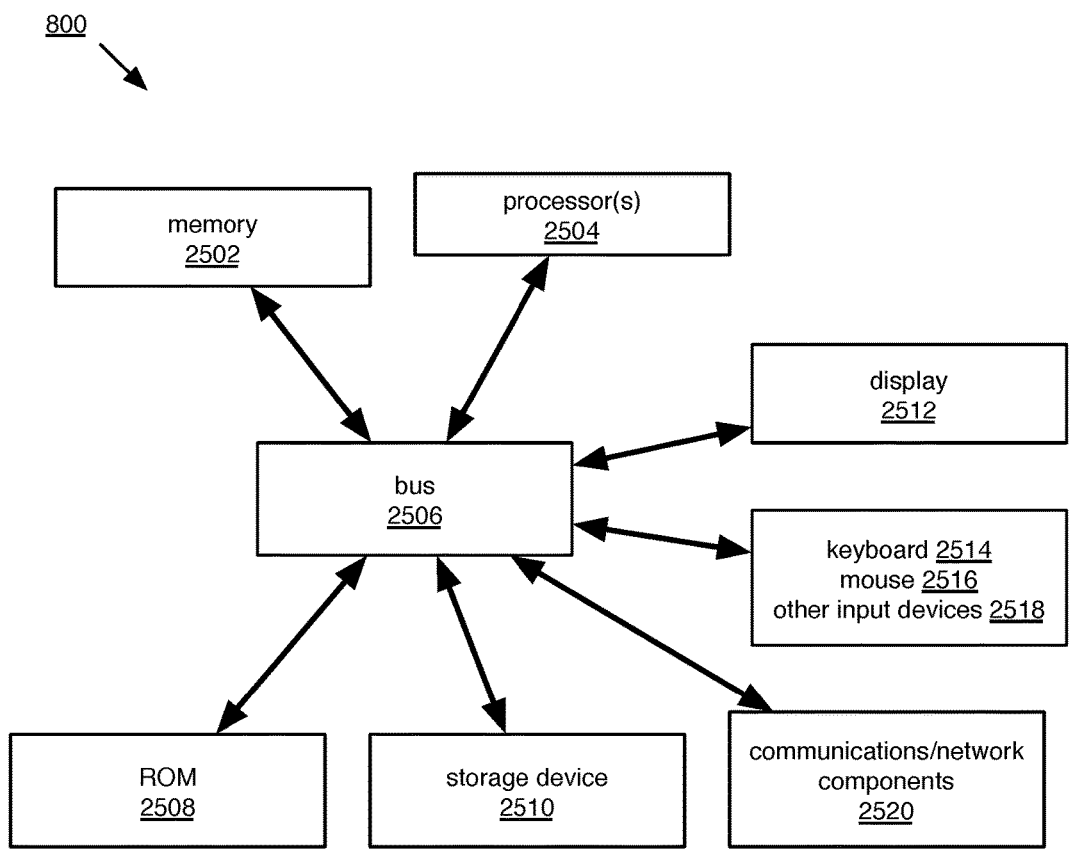
FIG. 8 shows a block diagram of an exemplary computing system in accordance with some embodiments of the invention.

FIG. 8 is a block diagram showing an exemplary computing system 800 that is representative any of the computer systems or electronic devices discussed herein. Note that not all of the various computer systems have all of the features of system 800. For example, systems may not include a display inasmuch as the display function may be provided by a client computer communicatively coupled to the computer system or a display function may be unnecessary.

System 800 includes a bus 2506 or other communication mechanism for communicating information, and a processor 2504 coupled with the bus 2506 for processing information. Computer system 800 also includes a main memory 2502, such as a random access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 800 includes a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 800 may be coupled via the bus 2506 to a display 2512 for displaying information to a computer user. An input device such as keyboard 2514, mouse 2516, or other input devices 2518 may be coupled to the bus 2506 for communicating information and command selections to the processor 2504. Communications/network components 2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C#, C/C++, Java, Javascript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 800 or similar electronic computing device, that manipulates and transforms data represented as physical (electronic) quantities within its registers and memories into other data similarly represented as physical quantities within its memories or registers or other such information storage, transmission or display devices.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method for customizing a teleconferencing user experience using a virtual agent instantiated at a server, the server comprising a processor, comprising:

receiving, by the processor, an upload audio stream and an upload video stream generated at an endpoint of a video conferencing system;

converting, by the processor, the upload audio stream to one or more text-user statements;

determining, by the processor, one or more meeting quality parameters based on a test video stream;

determining, by the processor, one or more user-intent names and a corresponding one or more user-context parameters based on the one or more text-user statements;

generating, by the processor, a responsive agent statement based on the one or more user-intent names or the one or more meeting quality parameters;

generating, by the processor, an action based on the one or more user-intent names or the one or more meeting quality parameters;

converting, by the processor, the responsive agent statement to an audio-agent-speech representation;

generating, by the processor, a download video stream comprising an animated agent representation based on the audio-agent-speech representation, and a chat transcript comprising the one or more text-user statements and the responsive agent statement;

providing, by the processor, a download audio stream comprising the audio-agent-speech representation and the download video stream; and providing, by the processor, an instruction to a device to execute the action.

2. The method of claim 1, wherein the test video stream is the upload video stream.

3. The method of claim 1, wherein the responsive agent statement is generated based on the one or more meeting quality parameters having value that is outside of an acceptable range.

4. The method of claim 1, wherein the responsive agent statement is generated based on the one or more user-intent name representing a response to a prompt-agent statement that is a request for information.

5. The method of claim 1, wherein the responsive agent statement concerns a video quality issue, an audio quality issue, a network quality issue, or a meeting connection issue.

6. The method of claim 1, wherein determining, by the processor, the one or more user-intent names and a corresponding one or more user-context parameters is further based upon a profile for the user.

7. The method of claim 1, wherein the responsive agent statement is a notification that the action is or has been executed.

8. A video conferencing system, comprising:

one or more processors;

one or more storage devices communicatively coupled to the one or more processors; and a set of instructions on the one or more storage devices that, when executed by the one or more processors, cause the processor to:

receive an upload audio stream and an upload video stream generated at an endpoint of the video conferencing system;

convert the upload audio stream to one or more text-user statements;

determine one or more meeting quality parameters based on a test video stream;

determine one or more user-intent names and a corresponding one or more user-context parameters based on the one or more text-user statements;

generate a responsive agent statement based on the one or more user-intent names or the one or more meeting quality parameters;

generate an action based on the one or more user-intent names or the one or more meeting quality parameters;

convert the responsive agent statement to an audio-agent-speech representation;

generate a download video stream comprising an animated agent representation based on the audio-agent-speech representation, and a chat transcript comprising the one or more text-user statements and the responsive agent statement;

provide a download audio stream comprising the audio-agent-speech representation and the download video stream; and provide an instruction to a device to execute the action.

9. The system of claim 8, wherein the test video stream is the upload video stream.

10. The system of claim 8, wherein the responsive agent statement is generated based on the one or more meeting quality parameters having value that is outside of an acceptable range.

11. The system of claim 8, wherein the responsive agent statement is generated based on the one or more user-intent name representing a response to a prompt-agent statement that is a request for information.

12. The system of claim 8, wherein the responsive agent statement concerns a video quality issue, an audio quality issue, a network quality issue, or a meeting connection issue.

13. The system of claim 8, wherein determining the one or more user-intent names and a corresponding one or more user-context parameters is further based upon a profile for the user.

14. The system of claim 8, wherein the responsive agent statement is a notification that the action is or has been executed.

15. A non-transitory machine-readable storage medium comprising instructions that, when executed by a processor, cause the processor to:

receive an upload audio stream and an upload video stream generated at an endpoint of a video conferencing system;

convert the upload audio stream to one or more text-user statements;

determine one or more meeting quality parameters based on a test video stream;

determine one or more user-intent names and a corresponding one or more user-context parameters based on the one or more text-user statements;

generate a responsive agent statement based on the one or more user-intent names or the one or more meeting quality parameters;

generate an action based on the one or more user-intent names or the one or more meeting quality parameters;

convert the responsive agent statement to an audio-agent-speech representation;

generate a download video stream comprising an animated agent representation based on the audio-agent-speech representation, and a chat transcript comprising the one or more text-user statements and the responsive agent statement;

provide a download audio stream comprising the audio-agent-speech representation and the download video stream; and provide an instruction to a device to execute the action.

16. The non-transitory machine-readable storage medium of claim 15, wherein the test video stream is the upload video stream.

17. The non-transitory machine-readable storage medium of claim 15, wherein the responsive agent statement is generated based on the one or more meeting quality parameters having value that is outside of an acceptable range.

18. The non-transitory machine-readable storage medium of claim 15, wherein the responsive agent statement is generated based on the one or more user-intent name representing a response to a prompt-agent statement that is a request for information.

19. The non-transitory machine-readable storage medium of claim 15, wherein the responsive agent statement concerns a video quality issue, an audio quality issue, a network quality issue, or a meeting connection issue.

20. The non-transitory machine-readable storage medium of claim 15, wherein determining the one or more user-intent names and a corresponding one or more user-context parameters is further based upon a profile for the user.

* * * * *